US010645232B2

(12) United States Patent
Doyle, Sr. et al.

(10) Patent No.: US 10,645,232 B2
(45) Date of Patent: *May 5, 2020

(54) DEVICE FOR THE PASSIVE MONITORING AND REPORTING OF PRINTER-RELATED DATA ON USB CABLES

(71) Applicant: EMERGE PRINT MANAGEMENT, LLC, Tampa, FL (US)

(72) Inventors: Daniel Doyle, Sr., Bellair, FL (US); Patrick Adesso, Tampa, FL (US); Jill Castillenti, Dade City, FL (US); Gideon Hecht, Tampa, FL (US); Brian Lauman, Clearwater, FL (US); Daniel Doyle, Jr., Bellair, FL (US); Alex Berndt Campbell, Tampa, FL (US); Marvin Scaff, Tampa, FL (US)

(73) Assignee: EMERGE PRINT MANAGEMENT, LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,642

(22) Filed: Dec. 24, 2018

(65) Prior Publication Data

US 2019/0149670 A1 May 16, 2019

Related U.S. Application Data

(63) Continuation of application No. 15/172,210, filed on Jun. 3, 2016, now Pat. No. 10,165,130, which is a
(Continued)

(51) Int. Cl.
*G06F 3/12* (2006.01)
*H04N 1/00* (2006.01)
(Continued)

(52) U.S. Cl.
CPC ....... *H04N 1/00042* (2013.01); *G06F 3/1204* (2013.01); *G06F 3/1207* (2013.01); *G06F 3/1229* (2013.01); *G06F 3/1236* (2013.01); *G06F 3/1259* (2013.01); *G06F 3/1292* (2013.01); *G06Q 10/06* (2013.01); *G06Q 10/08* (2013.01); *H04N 1/00015* (2013.01); *H04N 1/00039* (2013.01); *H04N 1/00079* (2013.01); *H04N 1/00323* (2013.01); *H04W 84/12* (2013.01); *H04W 84/18* (2013.01); *H04W 88/08* (2013.01)

(58) Field of Classification Search
None
See application file for complete search history.

(56) References Cited

U.S. PATENT DOCUMENTS 6,009,284 A * 12/1999 Weinberger ........ G03G 15/5079
399/77
6,473,811 B1 * 10/2002 Onsen ................ H04N 1/00278
702/223

(Continued)

*Primary Examiner* — Beniyam Menberu

(57) ABSTRACT

Provided is a device for monitoring printer-related data on USB cables. The USB-compatible device comprises a first USB connector, a second USB connector, a processor, and a non-volatile memory. The device stores printer-related data, reports stored printer-related data to a server, and removes the stored printer-related data from the non-volatile memory.

11 Claims, 4 Drawing Sheets

Related U.S. Application Data continuation-in-part of application No. 14/621,616, filed on Feb. 13, 2015, now abandoned, and a continuation-in-part of application No. 14/622,011, filed on Feb. 13, 2015, now abandoned.

(60) Provisional application No. 61/939,403, filed on Feb. 13, 2014, provisional application No. 61/939,365, filed on Feb. 13, 2014, provisional application No. 61/939,374, filed on Feb. 13, 2014, provisional application No. 61/939,388, filed on Feb. 13, 2014, provisional application No. 61/939,419, filed on Feb. 13, 2014.

(51) Int. Cl.
*H04W 84/12* (2009.01)
*H04W 84/18* (2009.01)
*H04W 88/08* (2009.01)
*G06K 15/02* (2006.01)
*G06Q 10/08* (2012.01)
*G06Q 10/06* (2012.01)

(56) References Cited

U.S. PATENT DOCUMENTS

| | | | |
|---|---|---|---|
| 10,165,130 B2* | 12/2018 | Doyle, Sr. | H04N 1/00042 |
| 2005/0015523 A1* | 1/2005 | Ishida | G06F 13/385 |
| | | | 710/52 |
| 2005/0097198 A1* | 5/2005 | Getler | H04N 1/00233 |
| | | | 709/223 |
| 2005/0254078 A1* | 11/2005 | Patton | G06F 3/1205 |
| | | | 358/1.13 |
| 2006/0218272 A1* | 9/2006 | Murakami | G06F 3/1204 |
| | | | 709/224 |
| 2011/0261391 A1* | 10/2011 | Oba | G06F 3/1203 |
| | | | 358/1.15 |
| 2012/0120259 A1* | 5/2012 | Sakiyama | G06F 3/1204 |
| | | | 348/207.2 |
| 2012/0221720 A1* | 8/2012 | Trevino | G01D 4/004 |
| | | | 709/224 |
| 2012/0274974 A1* | 11/2012 | Itogawa | G06F 3/122 |
| | | | 358/1.14 |

* cited by examiner

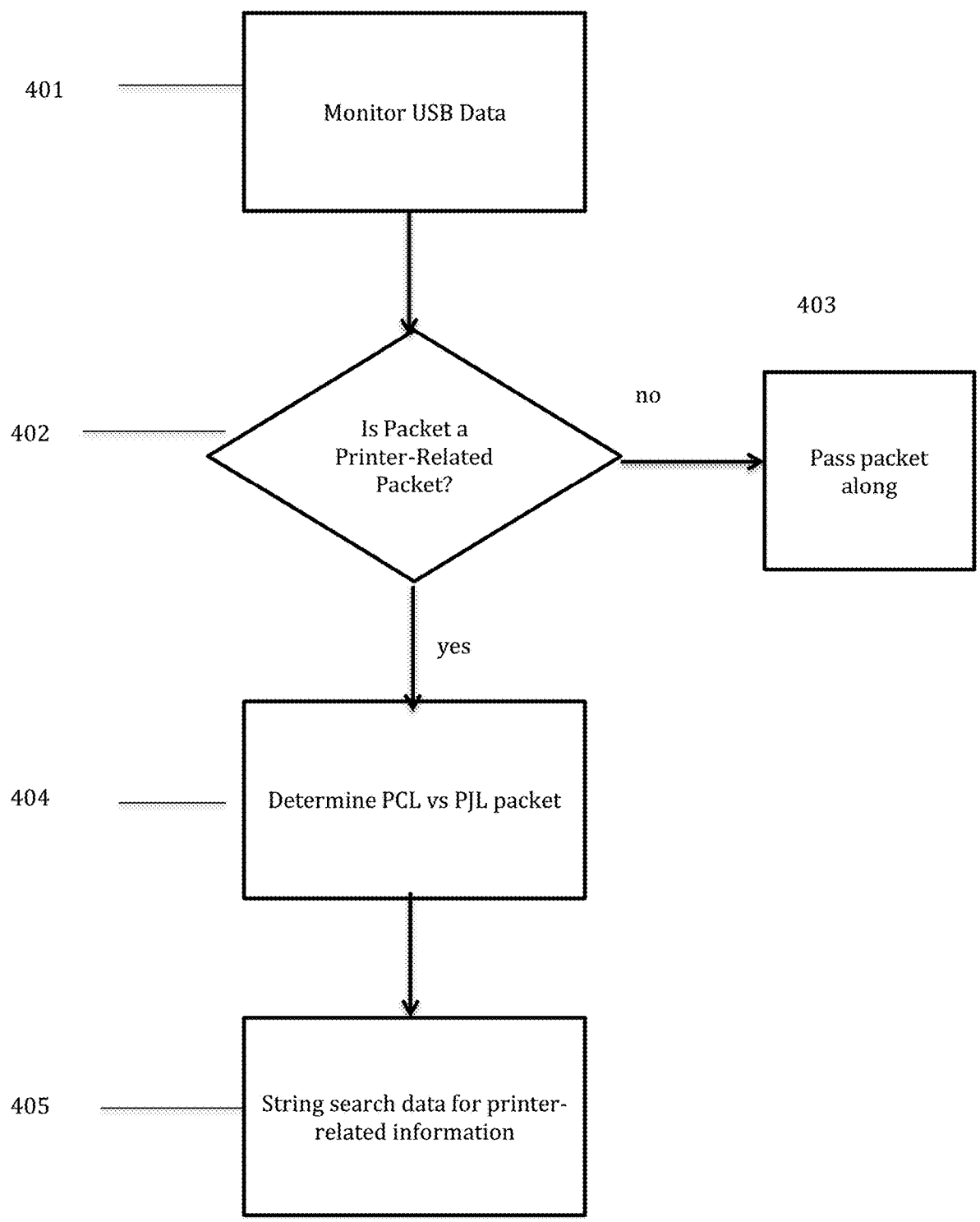

DEVICE FOR THE PASSIVE MONITORING AND REPORTING OF PRINTER-RELATED DATA ON USB CABLES

RELATED APPLICATION DATA

This application is a continuation of application Ser. No. 15/172,210, filed Jun. 3, 2016, entitled "System and Method for the Passive Monitoring and Reporting of Printer-Related Data on USB Cables, and is a continuation-in-part of application Ser. No. 14/621,616, filed Feb. 13, 2015, entitled "System and Method for the Passive Monitoring and Reporting of Printer-Related Data on USB Cables," and is a continuation-in-part of application Ser. No. 14/622,011, filed Feb. 13, 2015, entitled "System and Method for Monitoring Printer-Related Data on USB Cables," and claims priority to U.S. Provisional Patent Application Ser. No. 61/939,403, filed Feb. 13, 2014, entitled "System and Method for Monitoring Printer-Related Data on USB Cables," U.S. Provisional Patent Application Ser. No. 61/939,365, filed Feb. 13, 2014, entitled "System and Method for the Passive Monitoring and Reporting of Printer-Related Data on USB Cables," U.S. Provisional Patent Application Ser. No. 61/939,374, filed Feb. 13, 2014, entitled "System and Method for the Near Field Communication Pairing of Components of a Printer-Related Data Reporting System," U.S. Provisional Patent Application Ser. No. 61/939,388, filed Feb. 13, 2014, entitled "System and Method for the Barcode Pairing of Components of a Printer-Related Data Reporting System," and U.S. Provisional Patent Application Ser. No. 61/939,419, filed Feb. 13, 2014, entitled "System and Method for the Passive Monitoring and Reporting of Network Content on USB Cables," the contents of which are fully incorporated by reference herein for all purposes.

TECHNICAL FIELD

This disclosure relates to a computer-implemented system and method for the passive monitoring and reporting of printer-related data on USB cables and relaying the data to a printer reporting system.

BACKGROUND OF THE INVENTION

Methods for detecting and compiling data relating to printer actions are known in the industry. Existing methods, however, often require the use of a designated computer within an established computer network that utilizes installed software for monitoring print events on the network. These methods suffer from several limitations, including the reliance on network administrators to perform a complex installation protocol, the need for customization, the need for compatibility and functionality within a variety computer operating system environments, the use of a client's hardware and network to gather and report data, and the use of internal client bandwidth to report printer-related data.

Thus, a need exists in the industry for overcoming the limitations associated with the use of installed software on an existing network computer for the passive monitoring printer-related data.

SUMMARY OF THE INVENTION

This disclosure provides for a system and method for the passive monitoring of printer-related data and relaying the data to a printer-related data reporting system.

The disclosed system has several important advantages. For example, the present disclosure provides a system for monitoring printer data that is more user friendly, reliable, dependable, and easier to install than existing print data monitoring systems.

Another advantage of the present system is that it eliminates the need for installing software on existing computers for monitoring print job related data.

Yet another advantage of the present system is eliminating the need for administrative access to computers to install the system.

Still yet another possible advantage of the disclosed system is providing hardware powered by a USB line, eliminating the need for an external power supply and decreasing the likelihood that the system will go offline as the result of a loss of external power.

Another advantage of the present system may include permitting the collection of more robust print job related information, including but not limited to device specific information, number of pages printed, and mono and/or color toner levels.

Yet another advantage of the present disclosure includes providing a system that allows the hardware's internal software to be updated, configured, and or expanded remotely.

Still yet another advantage of the present invention is the ability to monitor printer-related data on a non-networked printer and computer.

BRIEF DESCRIPTION OF THE DRAWINGS

For a more complete understanding of the present disclosure and its advantages, reference is now made to the following descriptions, taken in conjunction with the accompanying drawings, in which:

FIG. 4 is a flow chart depicting an associated computer-implemented method and system for monitoring and reporting printer-related data.

Similar reference numerals refer to similar parts throughout the several views of the drawings.

DETAILED DESCRIPTION OF THE PREFERRED EMBODIMENT

The present invention relates to a system and method for monitoring printer-related data on USB cables and relaying the data to a printer reporting system via a base station, wherein the monitoring is performed using hardware affixed to a USB cable. The various components of the present invention, and the manner in which they interrelate, are described in greater detail hereinafter.

The computer-implemented method and system may include, but are not limited to, the following steps. It will be appreciated by one skilled in the art that the order of steps presented herein may be performed in a different order. It will also be appreciated by one skilled in the art that the method and system described herein for monitoring and reporting printer-related data may include all, some, or none of the steps described herein.

Figure 1:
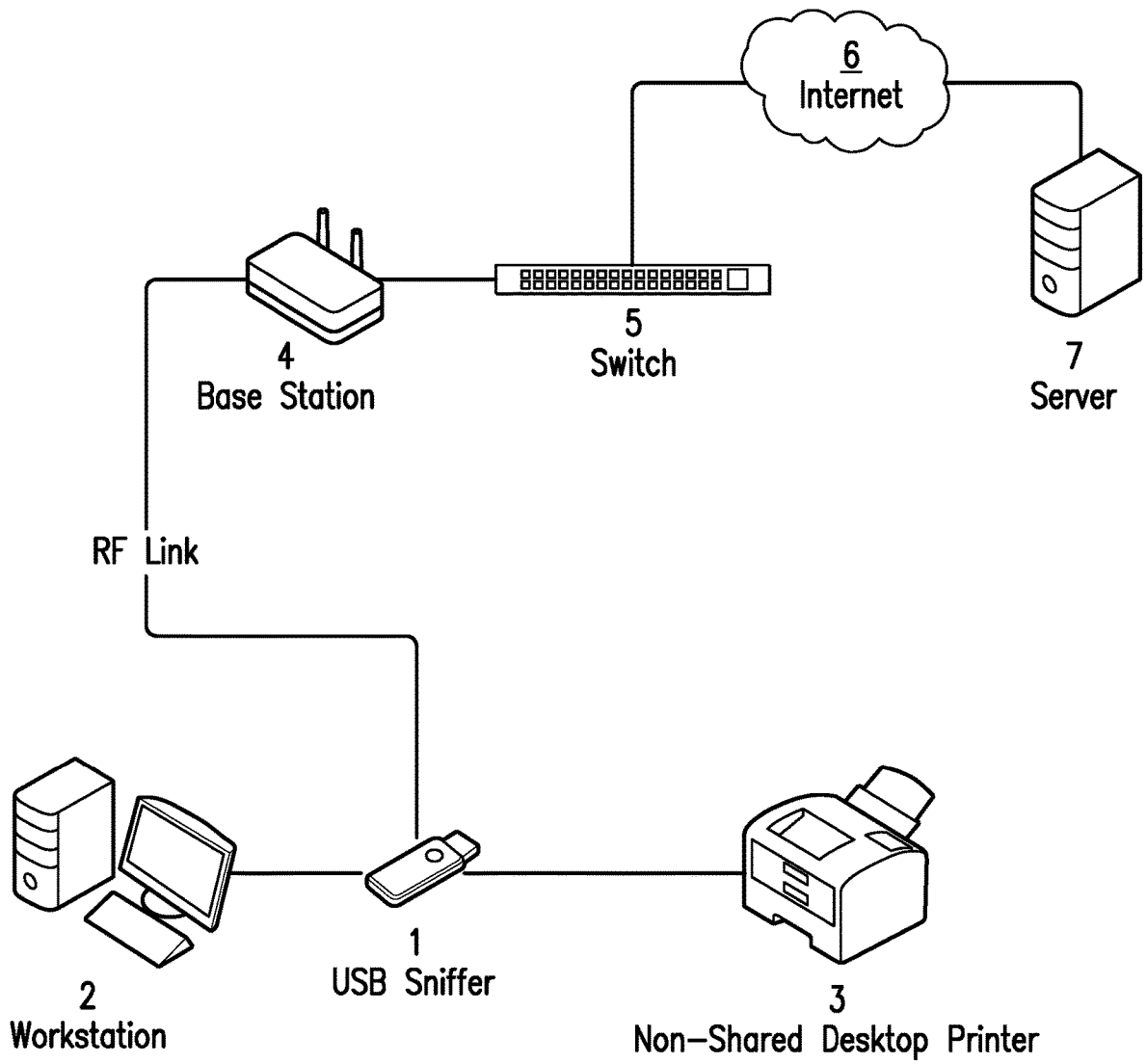
FIG. 1 is a diagram depicting the various components of an embodiment of the present invention.

Initially with reference to FIG. 1, the associated system includes placing a device 1 along a USB line between a personal computer 2 and a non-networked printer 3. The device 1 may include both male and female USB connectors for in-line connectivity. In one embodiment of the present invention the device 1 is a USB-compatible device capable of transmitting radio frequency bandwidth outside of an existing computer network. The device 1 passively monitors the USB line to detect printer actions, and reports data relating to printer actions to a base station 4 via a mesh network which may then, via a switch 5, connect to the internet 6 and/or a server 7. The data is reported to the base station 4 via the radio frequency bandwidth. Data relating to printer 3 actions may include, but is not limited to, the number of pages printed, color, ink or toner density, and other data. In one embodiment of the present invention, the system gathers data from outside of an existing network. The base station 4 subsequently aggregates the data and uploads the data to a server 7 over the internet 6 or other network. In an alternative embodiment of the present invention, the USB device connects directly to the internet 6 via radio frequency bandwidth, WiFi, cellular radio, Bluetooth, or other known communication technology and uploads the data to a server 7, thereby eliminating the need for a base station 4. The system does not require the installation of software on an associated computer 2. Further, the system does not require user-specific configuration because it is supplied pre-configured to monitor print jobs and printer-related data.

Figure 2:
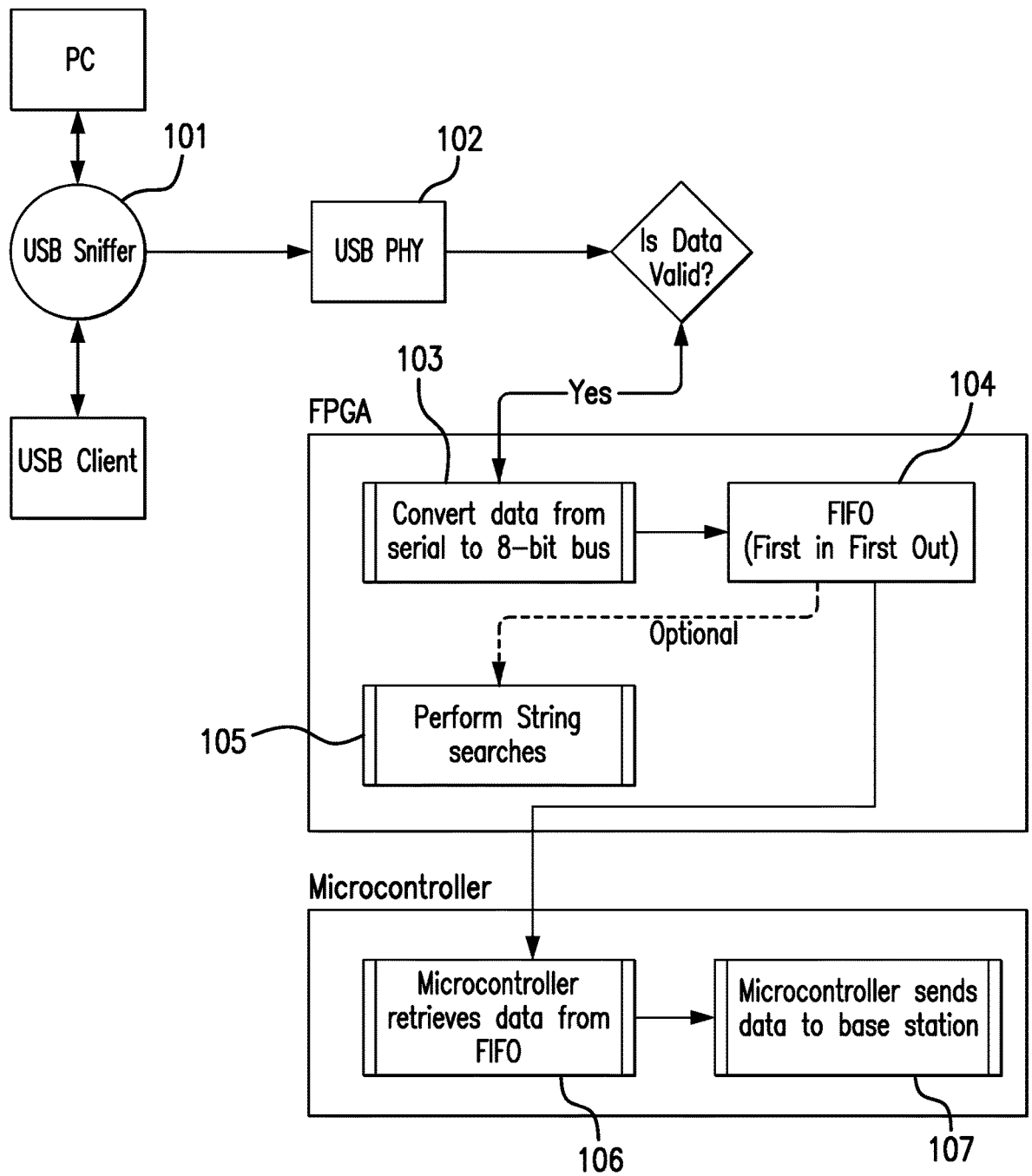
FIG. 2 is a flow chart depicting a computer-implemented method and system of the present disclosure.

With continued reference to FIG. 1, and now with reference to FIG. 2, the USB device may include a field programmable gate array (FPGA) and a microcontroller. The FPGA device, with its embedded content monitoring system for monitoring printer-related data, monitors traffic over a USB cable by looking directly for information that a printer has printed a page. This monitoring may be performed by searching for keywords in the data traffic indicating that a printer has printed a page. The device then shares the information via radio to a local base station or patrol device. More particularly, the device uses a USB PHY to synchronize the retrieval of data transfer from the USB line and performs low-level validation of the data, converting from serial data to an 8-bit bus. The data is then queued in a First In First Out (FIFO) within the FPGA. The FPGA may be equipped to perform string searches on the incoming data and/or provide the full bandwidth data to the microcontroller for searching and/or manipulation within the microcontroller. Upon notification from the FPGA, the microcontroller retrieves data from the FIFO and processes it. The processed data is then sent to the base station, or patrol device, via a mesh radio network that was previously established.

In one embodiment of the invention, and with continued reference to FIG. 2, the system and method include 1) capturing passing data with the USB device 101; 2) validating the data with a USB PHY 102 and then synchronizing the data transfer; 3) converting the data from serial to 8-bit data with the FPGA 103; 4) queuing the data in queue FIFO 104; 5) searching the data for particular string sets relating to printing 105; and 6) receiving and packaging the data at the microcontroller 106 to send it to the base station via RF 107.

In an embodiment of the present disclosure, all USB data traffic between the workstation 2 and the non-networked printer 3 is monitored by the device 10. Specialized software on the device 10 parses the USB data traffic and looks up keywords that have particular meaning in connection with printing commands. See e.g. FIG. 4 at 401-402. If the packet is not a printer-related packet, the packet is passed along. See FIG. 4 at 403. Notably, the information the device 10 uses for looking up particular keywords and their printing association can be updated on the device 10, for instance through a firmware update. This enables, for instance, the device 10 to be updated in the field in order to recognize and analyze USB traffic for additional non-networked printers that were not known at the time the device 10 was originally deployed.

The device 10 is further configured to interrogate the non-network printer 3 for status or error information, without interrupting or interfering with the printing services. The device 10 can then transmit the information it has gathered, both through monitoring the USB data stream and querying the non-network printer 3, to the base station 4, preferably using a private network connection between the device 10 and the base station 4. In a preferred embodiment, the private network is a wireless Zigbee mesh network or WIFI. The base station 4 then reports this gathered information to a centralized server 7.

Passive USB Monitoring

As shown in FIG. 1, a device 1 in accordance with the present disclosure connects via USB between a workstation 2 and a non-networked printer 3. The device 10 passively monitors the USB data stream between the workstation 2 and the non-networked printer 3. This passive USB monitoring reviews every data packet sent between the workstation 2 and the non-networked printer 3. The first byte of each USB data packet contains the Packet Identifier (PID). In a preferred embodiment, the following PIDs will be processed by the device 10.

1. Token OUT—Indicating whether the next data packet will be from the host to the device.

2. Token IN—Indicating whether the next data packet will be from the device to the host.

3. Data DATA0—Indicating whether the data packet is even.

4. Data DATA1—Indicating whether the data packet is odd.

The token packets described above, as well as other relevant packet data, is used to determine the direction of data flow. If the direction is inbound to the workstation 2, the data packets that follow are assumed to be PJL ("Printer Job Language") whereas, if the direction is outbound from the workstation 2, the data packets that follow are assumed to be PCL ("Printer Control Language"). The data packets are verified to be either PJL or PCL by parsing the string for "@PJ" for PJL and "!R!" for PCL. See FIG. 4 at 402, 404.

Once the data packet is properly determined to be either PJL or PCL, the packet is then string searched to find data of interest in step 105. See also FIG. 4 at 405. For example, "PAGES=" is relevant for PJL packets and "Color=x, Mono=x" for PCL packets wherein "x" can be as simple as a yes/no designation or can provide for a specific color. Other searches can be performed on the data packets such as compression, font, job separation, environment commands, status readback, device attendance, file system commands, and other relevant data. The examples provided should be considered non-limiting.

In a preferred embodiment, an internal lookup table or logic is maintained on the device 10 for storing strings of interest to be searched for. As mentioned above, this lookup table can be updated with a firmware update enabling the device 10 to monitor additional printers, or look for additional strings that were not initially installed on the device 10.

In a preferred embodiment, the microcontroller in the device 10 programs the FPGA to look for certain strings in the USB data. It also programs the FPGA to capture a number of bytes following the string. The FPGA interrupts the microcontroller once the string has been captured with the additional bytes it was programmed to capture. The microcontroller then parses the data to obtain printer-related data. This printer-related data can include the number of pages printed, the size of the page, number of copies requested, whether printing was performed duplex, and whether the printing was color or mono.

The microcontroller is preferably configured to run a state machine to determine what printer language is being used. The printer languages can be PJL, Postscript, PCL6, ZJS, and PCL5, or any other suitable printing language. The FPGA provides status to the microcontroller to assist the state machine in knowing when a print job has started and stopped and what printer language is running. The FPGA also provides other statuses for the purpose of counting pages. For PCL5, form feed counting is done in the FPGA. At the end of the PCL5 job, the number of form feeds (i.e. pages) is returned to the microcontroller.

When the state machine recognizes that a printer-related command is being transmitted, the microcontroller performs a string search for certain pre-identified strings, wherein the pre-identified strings relate to printer-data. For example, the following strings may be searched for the respective printer languages:

PJL Strings:
SET QTY=
RESULT=OK
PAGES=
LETTER
LEGAL
JISEXEC
Postscript Strings:
NumCopies
/PageSize [
Page:
%%EndPageSetup
%%Pages:
(%%[LastPage]%%)
%% EOF)
PCL 6 Strings
PrinterSubunit><dd:TotalImpressions>
<dd:MonochromeImpressions>
<dd:ColorImpressions>
1D
j
ZJS Strings
TotalPagesPrinted=
TotalMonochromePagesPrinted=
TotalColorPagesPrinted=
JZJ
ZJZ
PCL5 Strings
esc & l
esc & a Concerning the PCL 6 strings above, "1D" is used to locate page copies, while "j" is used to determine whether the printing is performed in color or mono. With ZJS strings, "JZJ" indicates little endian for parsing purposes, while "ZJZ" indicates big endian. Concerning the PCL5 strings, "esc & l" determines the number of copies, eject page, and paper size, while "esc & a" indicates whether printing is performed duplex.

Figure 3:
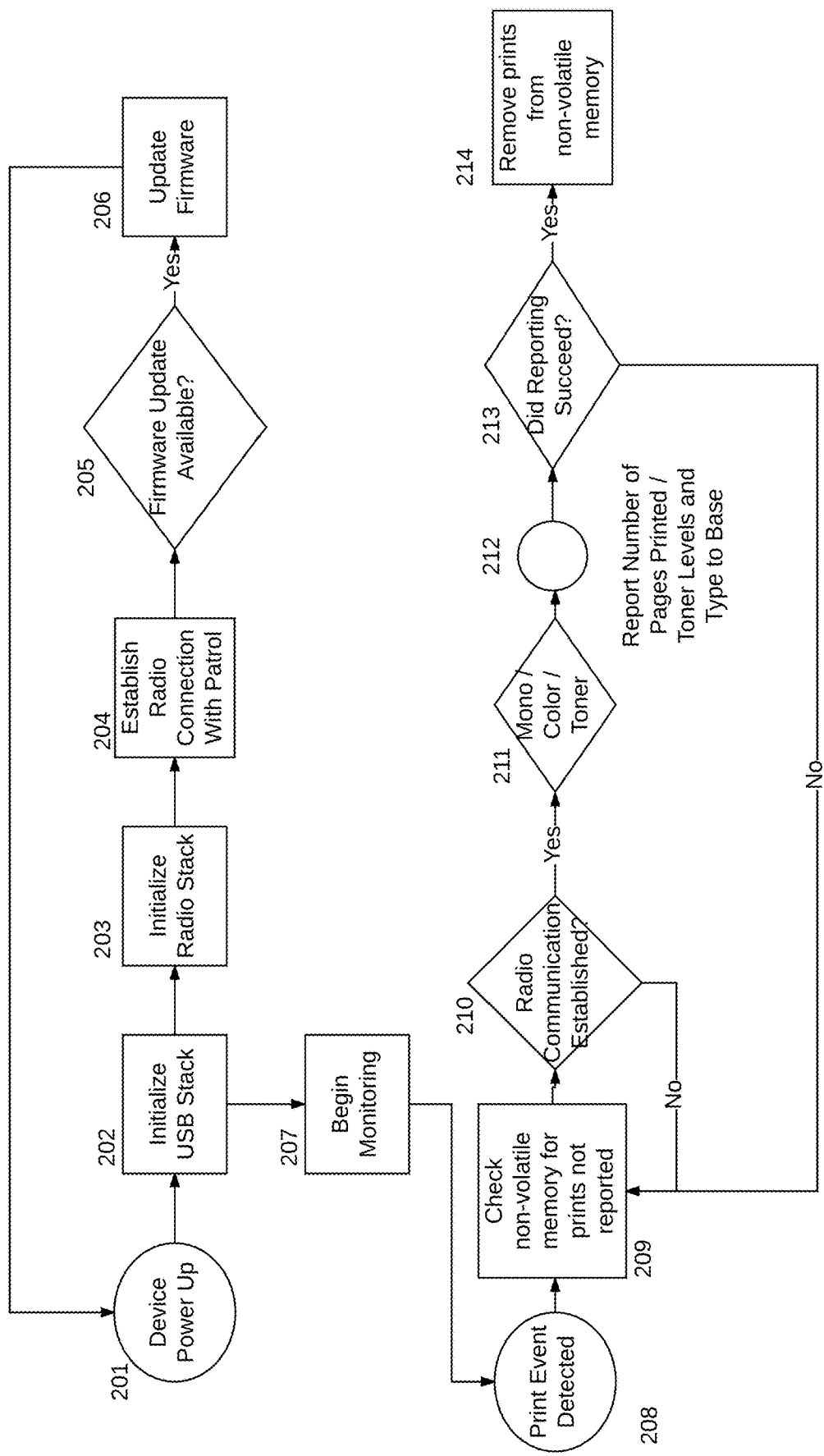
FIG. 3 is a flow chart depicting an associated computer-implemented method and system for monitoring and reporting printer-related data.

With reference to FIG. 3, the associated system and method for monitoring and reporting printer-related data allows for the remote update of its application code, or firmware, by initializing the USB stack 202 after power up 201, initializing its radio software stack 203, and checking with the base station 204 to determine whether a firmware update exists 205. If a firmware update exists, the system updates the firmware 206. Once an update is complete or the device determines that an update is not required, it begins monitoring the USB data 207. Once a print event is detected 208, the device checks its non-volatile memory 209 for previous print events that were detected but not reported, and verifies that radio communication exists with the base station 210. If radio communication exists, the device reports the print event details 211, 212 to the base station and flags the event as reported 213. If appropriately flagged, the unit then removes the print event details from the non-volatile memory and returns to the monitoring state 214. This entire process is completed without the need for the device to enumerate on the host computer.

It will be understood by those of skill in the art that flowcharts and block diagrams herein described may illustrate architecture, algorithms, functionality, and operation of possible implementations of systems, methods and computer program products according to various embodiments. Therefore, it will be understood that each block in the flowchart or block diagram may represent a module, segment, or portion of code, which comprises one or more executable computer program instructions for implementing the specified logical function or functions. Further, some implementations may include the functions in the blocks occurring out of the order as herein presented. By way of non-limiting example, two blocks shown in succession may be executed substantially concurrently, or the blocks may at times be executed in the reverse order, depending upon the functionality involved. It will also be noted that each block of the block diagrams and flowcharts, and combinations of blocks in the block diagram and flowchart illustrations, may be implemented by special purpose hardware-based systems that perform the specified functions or acts, or combinations of special purpose hardware and computer program instructions.

The system includes one or more processing devices, which may be any computer processing unit, and could be a single central processing unit, or a number of processing units configured to operate either in sequence or in parallel. The processing device can be configured to execute software processes which implement the steps disclosed herein. The system may also include a memory capable of storing the steps necessary for a processing device to implement the steps disclosed herein. This memory could be in the form of memory resident within the processing device or in the form of standalone memory coupled to the processing unit via a communication path, such as a bus or a network.

Although this disclosure has been described in terms of certain embodiments and generally associated methods, alterations and permutations of these embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A device for passively monitoring non-networked-printer data, the device comprising:
a first USB connector, a second USB connector, a processor, and a non-volatile memory, the device configured to connect between a computer and a non-networked printer via the USB connectors, the processor configured to:

analyze USB data packets having a pre-determined packet id;

determine printer-related data from an analyzed USB data packet;

store the printer-related data in the non-volatile memory;

analyze the non-volatile memory for any non-reported printer-related data;

report printer-related data stored in the non-volatile memory to a base station;

flag in the non-volatile memory the reported printer-related data as reported; and remove all printer-related data that has been flagged as reported from the non-volatile memory.

2. The device as described in claim 1, wherein the first USB connector comprises a male USB connector.

3. The device as described in claim 1, wherein the second USB connector comprises a female USB connector.

4. The device as described in claim 1, wherein the predetermined packet id is a Token IN.

5. The device as described in claim 1, wherein determining printer-related data comprises analyzing a payload of the USB data packet for Printer Job Language commands.

6. The device as described in claim 1, wherein the predetermined packet id is a Token OUT.

7. The device as described in claim 1, wherein determining printer-related data comprises analyzing a payload of the USB data packet for Printer Control Language commands.

8. The device as described in claim 1 wherein the printer-related data is a page count.

9. A device for monitoring non-networked printer data, the device comprising:
   a first USB connector;
   a second USB connector, wherein the device is configured to connect between a computer and the non-networked printer;
   a communication interface;
   a processor; and
   a non-volatile memory, wherein the processor is configured to:
      analyze USB data;
      store printer-related data in the non-volatile memory;
      report stored printer-related data to a server using the communication interface;
      flag in the non-volatile memory the reported printer-related data as reported; and
      remove stored printer-related data that has been flagged.

10. The device as described in claim 9 wherein the communication interface is a radio interface.

11. The device as described in claim 9 wherein the communication interface is a mesh network interface.

* * * * *